Jan. 20, 1942.  P. A. SCHNEBELEN  2,270,563
EMERGENCY KIT
Filed July 5, 1940
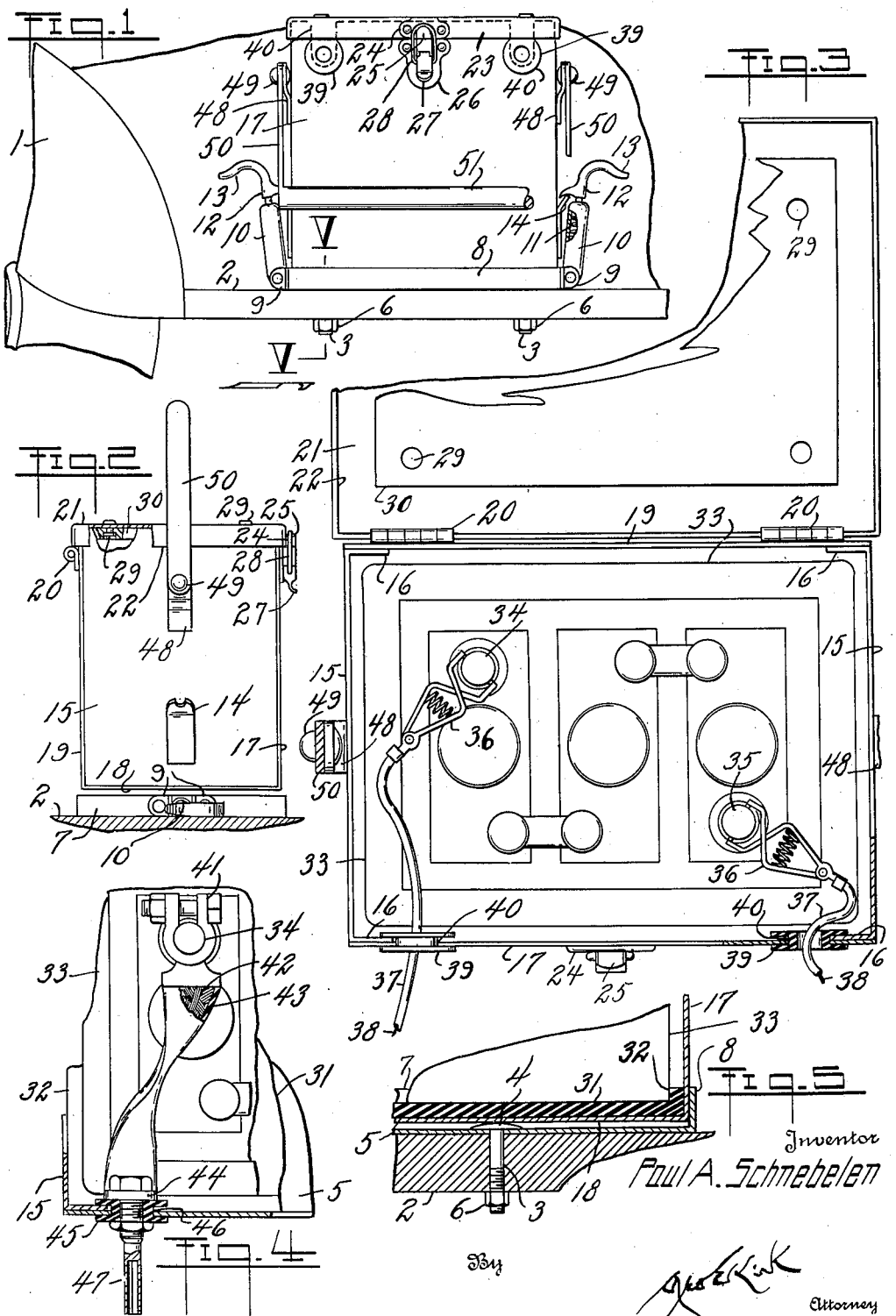
Inventor
Paul A. Schnebelen
By
Attorney Patented Jan. 20, 1942

2,270,563

UNITED STATES PATENT OFFICE 2,270,563

EMERGENCY KIT

Paul A. Schnebelen, Toledo, Ohio, assignor to Hi-Speed Tire and Accessory Company, Toledo, Ohio, a corporation of Ohio Application July 5, 1940, Serial No. 344,036

2 Claims. (Cl. 136—181)

This invention relates to readily attachable and detachable carrier installations for electric storage batteries in remote welding, soldering, brazing, and analogous operations as in quick linecare use.

This invention has utility when incorporated in a secondary battery box as on the running board of a truck for telephone service men in carrying the battery to be readily accessible for bringing to the region of work by removing from the truck or car and taking to the pole or elsewhere as the emergency arises requiring quick attention.

Referring to the drawing:

Fig. 1 is a fragmentary view of a motor vehicle having an embodiment of the invention therewith attached to the running board;

Fig. 2 is a view of the device from the left of Fig. 1, with parts broken away;

Fig. 3 is a plan view of the device of Fig. 1, with the closure thrown to open position and partly broken away;

Fig. 4 is a fragmentary enlarged view of a terminal take-off for fixture exterior of the carrier box; and Fig. 5 is a section on the line V—V, Fig. 1, showing features of the nested tray construction for the carrier and its anchorage.

Motor vehicle 1 is shown as provided with running board 2. Bolts 3 through the running board 2 have heads 4 engaging the bottom or base 5. These bolts 3 are detachably fixed with the running board 2 by nuts 6. This base or anchorage 5 is provided with an upstanding flange or rim having ends 7 and sides 8 therebetween as an endless flange. These portions 7 have ears 9 having swing tubes 10 as housings for springs 11 connected to hooks 12 having outwardly extending handles 13. There is thus provided quick self-adjusting holders of the automobile hood type in which this hook 12 may engage offset 14 from channel shaped ends 15 of the battery box or emergency kit herein. These ends 15 have inwardly bent sides 16 engaging front 17 extending around bottom 18 to back 19 of the main U-shaped strip portion in completing the open top structure of the box. This back 19 has hinge 20 mounting top plate or closure 21, bounded by endless rim 22, which at closed position fits over the upstanding sides of the ends 15 and the front 17 and back 19. In this telescopic position of overhang the front portion of flange 23 has fitting 24 carrying a lug 25. On the side 17 there is fixture 26 carrying lever 27 to draw link 28 of the trunk fastening type in yieldably drawing and holding the closure 21 in position. This closure top plate 21 on the inner side thereof has by countersunk fittings 29 an insulation panel or plate as board 30.

On the bottom 18 there is placed insulation tray 31 having side walls 32 as a sort of cup or leakage receptacle. Into this inner tray or cup 31 may be placed secondary battery 33 having terminals 34, 35, say in a gang set-up for three cells. From these terminals by clamps 36, in flexible conductors 37, leads 38 may pass through insulation eyes 39. The eyes 39 are located in the slots 40 in spacing below the flanges 23 of the closure 21.

In lieu of access to this emergency kit or box for the battery, clamps 41 from the respective terminals 34, 35, may have braided flat lead 42 in insulation jacket 43 to fixture 44 through insulation plug 45, say as flexed against shifting upward by passing through opening 46 in the wall 17 of the battery box. This fixture 44 may provide socket 47 in which may be thrust the terminal for the leads in the service or tool lines as used in functioning hereunder.

In the operation herein there is readily placeable in this container or kit box a secondary battery 33. Such is firmly anchored with the vehicle against shifting in transit due to the motor vehicle hood type holding clamps or hooks. As the lineman reaches the destination or place where there is emergency attention required, if such be not convenient to the vehicle within the length of working line normally adopted, it is only necessary that the operator or attendant pull the hooks 13 to throw out these catches. The box is thus released so that ready carrying away of the box and battery may be had. To this end, ears 48 on the ends 15 have pivots 49 and a U-shaped bail 50 having insulation carrying handle 51 therebetween as a wood bar. This handle is quickly swung upward clear of the closed top 21 into convenient carrying position for the attendant to take the battery, local to the place for use, and effect the extension connections sought. As the operation is completed, the return of the kit or box 17 is one readily accomplished by dropping into or against the base 5 and bringing the snap hooks 12 into the holding position.

There is accordingly herein protection in safe carriage for this secondary battery. The base 5, 7, 8, is an effective anchorage as well as cup-shaped tray in the event there be slopping over from the battery box 33 even to eating of the walls 15, 17, 19, of the box proper. There is accordingly multi-fold protection and rigid anchorage in handling of this emergency kit.

What is claimed and it is desired to secure by United States Letters Patent is:

1. An emergency kit for linemen comprising a readily portable receptacle set, of which the first receptacle is an upwardly flanged rigid base adapted to be attached to the running board or other like support of a vehicle in providing anchorage, a second of which receptacles is a battery box upwardly extending to protrude from and surrounded by the base in providing a housing adapted to contain a battery unit, said base being provided with swingable spring hooks for clamping anchorage from the protruding box portion with the base for holding the set assembled, the third of such receptacles being an insulation cup seated in the box, which cup is adapted to provide a shallow pocket to receive the battery unit to space the unit from the base, a closure for the box having a filler against the top of the battery unit, a bail pivoted on the box and swingable from out-of-use clear of above the box to in-use position below the top of the box, and a clamp for holding the closure in shut position with the box in thereby anchoring the battery to be spaced from the box and closure by the cup and filler, thereby adapted to hold the unit with the flanged base for transit therewith and readily detachable by releasing the hooks for the box to be carried by the bail with the battery unit anchored therein.

2. An emergency kit for linemen comprising a readily portable three receptacle set, of which the first receptacle is an upwardly flanged rigid base adapted to be attached to the running board or other like support of a vehicle in providing anchorage, a second of which receptacles is a battery box upwardly extending to protrude from and surrounded by the base in providing a housing, a battery unit mounted in said housing, said base being provided with swingable spring hooks for clamping anchorage from the protruding box portion with the base for holding the set assembled, the third of such receptacles being an insulation cup seated in the box, which cup is adapted to provide a shallow pocket to receive the battery unit to space the unit from the base, a closure for the box having a filler against the top of the battery unit, a bail pivoted on the box and swingable from out-of-use clear of above the box to in-use position below the top of the box, and a clamp for holding the closure in shut position with the box in thereby anchoring the battery to be spaced from the box and closure by the cup and filler, thereby adapted to hold the unit with the flanged base for transit therewith and readily detachable by releasing the hooks for the box to be carried by the bail with the battery unit anchored therein.

PAUL A. SCHNEBELEN.